INVENTOR.
SAMUEL E. MERRIFIELD
BY Charles B. Haverstock
ATTORNEY

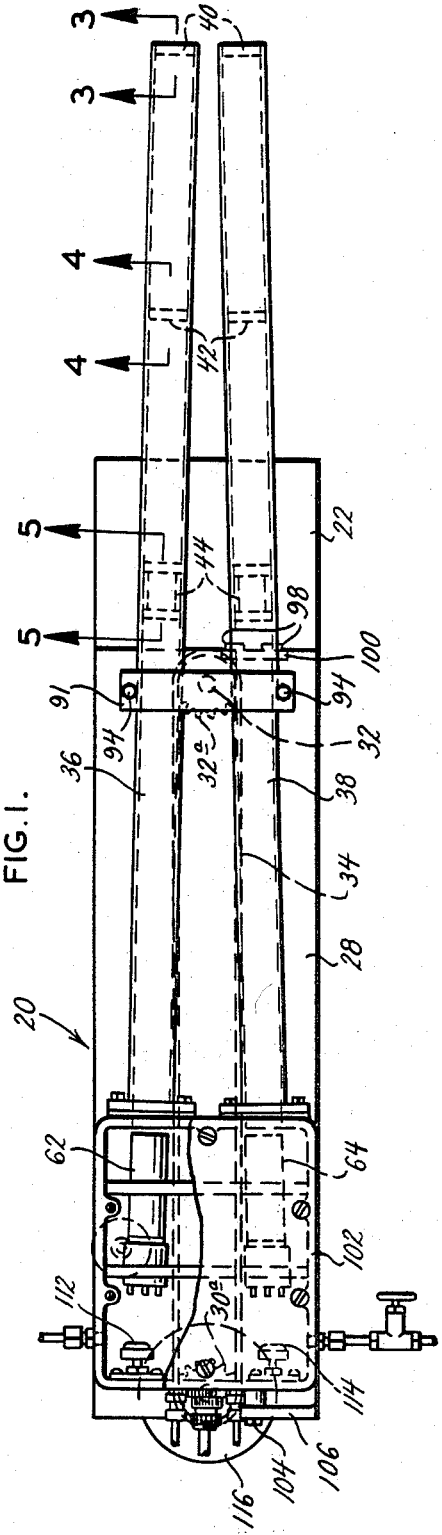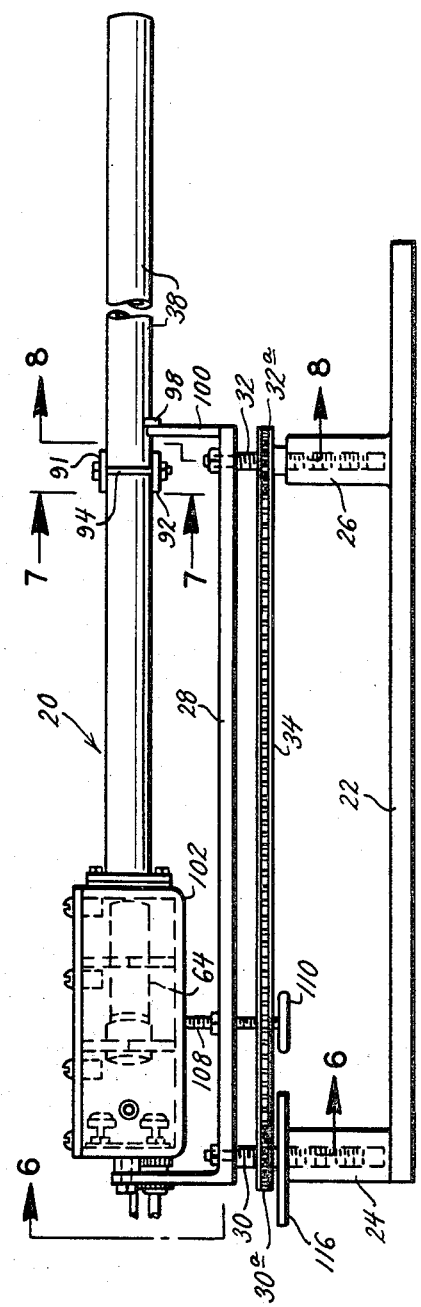

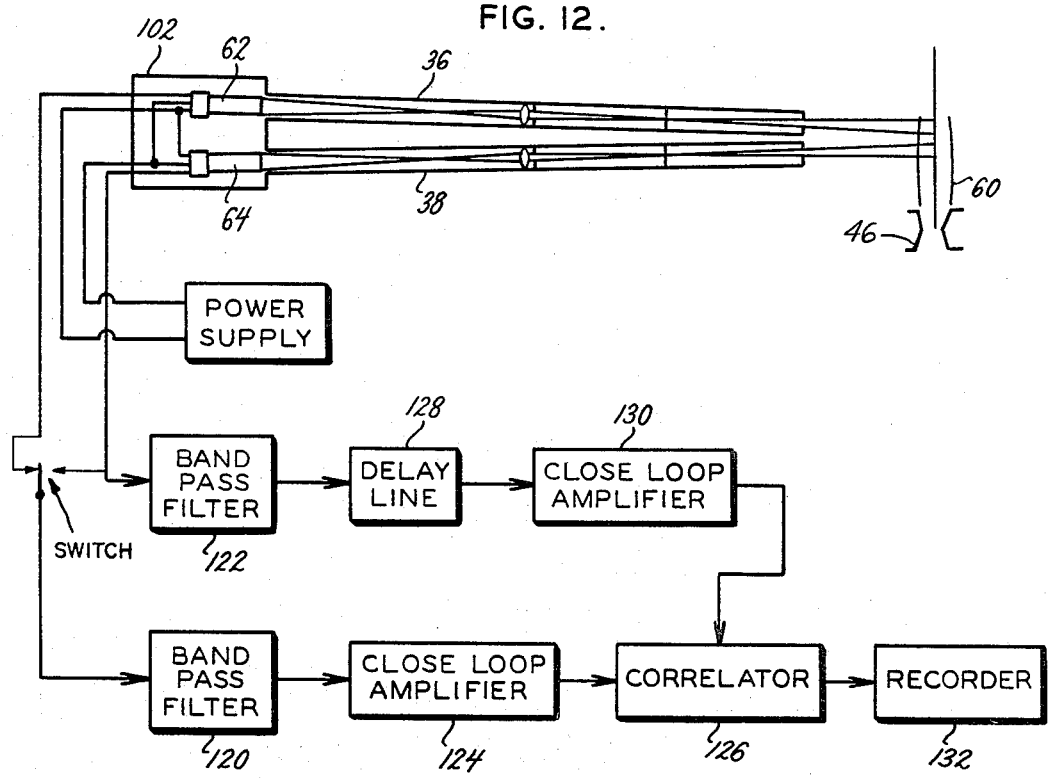
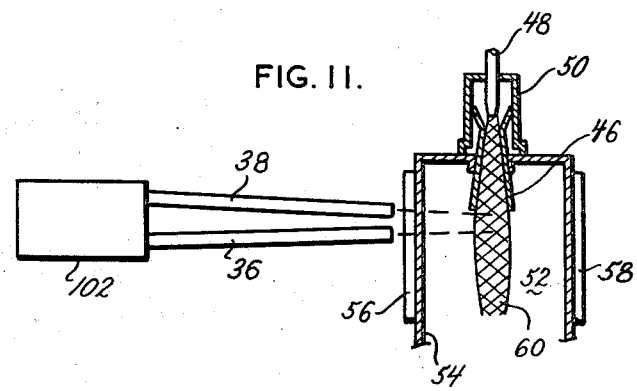
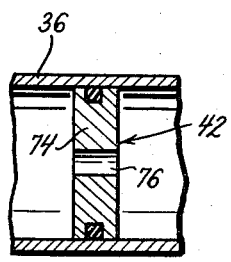
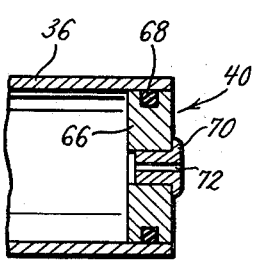

United States Patent Office 3,413,850
Patented Dec. 3, 1968

3,413,850
MEANS FOR DETERMINING THE VELOCITY OF A LUMINESCENT GAS STREAM
Samuel E. Merrifield, Florissant, Mo., assignor, by mesne assignments, to McDonnell Douglas Corporation, St. Louis, Mo., a corporation of Maryland
Filed May 6, 1966, Ser. No. 548,151
12 Claims. (Cl. 73—194)

ABSTRACT OF THE DISCLOSURE

An apparatus to determine the velocity of a luminescent gas stream with a pair of spaced optical devices having means sensitive to the illumination of the stream to produce an output signal responsive thereto and further including means for correlating the output signal.

---

The present invention relates generally to means for determining the velocity of gas streams, and more particularly to means for passively determining the velocity of luminescent gas streams.

Various means and methods are known and have been used to determine or measure the velocity of moving substances or streams such as gas streams. For the most part, the known means and methods have required inserting or injecting something into the stream, which something disturbs or disrupts the flow and adversely affects the data obtained and the accuracy of the calculations based thereon. For these and other reasons the known means and methods are not accurate and reliable enough for many purposes particularly when used to measure relatively high stream velocities. The present invention overcomes these and other disadvantages and shortcomings of known means and methods by teaching the construction and use of means for determining stream velocity without disturbing the stream plasma. The subject device comprises a pair of light collimating tubes including associated optical means and light sensitive means positioned and oriented to respond to the luminescent characteristics of a stream at spaced locations, and circuit means including signal correlator means connected to respond to signals generated by the light sensitive means for cross-correlating and auto-correlating said signals to produce data information from which the stream velocity can be determined. The subject means may also include means for determining the phase relationship between the signals sensed by the several light sensitive means, and means for recording or indicating the various correlation data produced by the correlator means.

It is a principal object of the present invention to provide improved, more accurate means for obtaining data from which to determine the velocity of a gas stream.

Another object is to provide means by which the velocity of a gas stream can be determined without disturbing the stream plasma.

Another object is to provide relatively inexpensive, easy to operate means by which the velocity of a gas stream can be determined.

Another object is to provide electro-optical means for obtaining information about a gas stream from which the stream velocity can be determined.

Another object is to provide passive means for obtaining statistical correlation information from which the velocity of a gas stream can be determined.

Another object is to provide accurate means for determining the velocity profile of moving fluid bodies such as gas streams and the like.

Another object is to provide passive means for gathering information about a luminescent gas stream or plasma.

Figure 6:
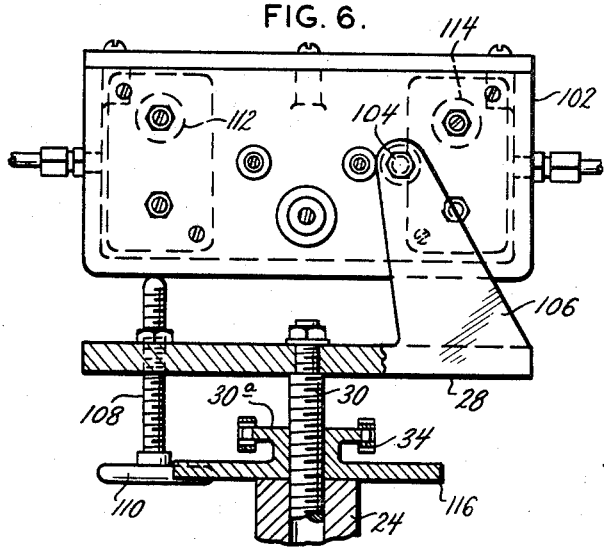
Figure 7:
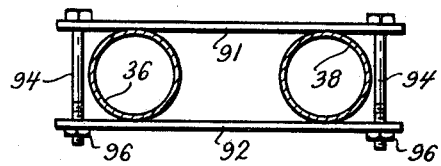
Figure 8:
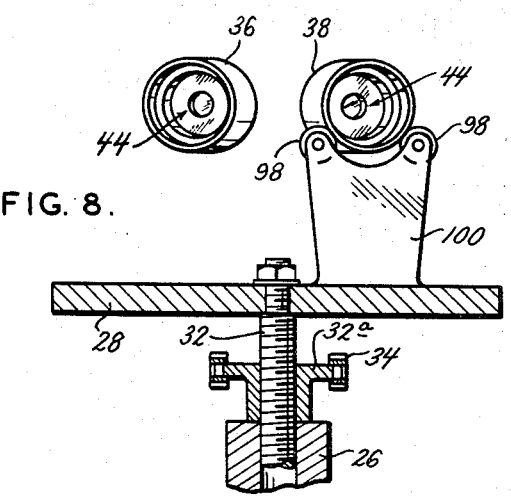
Figure 5:
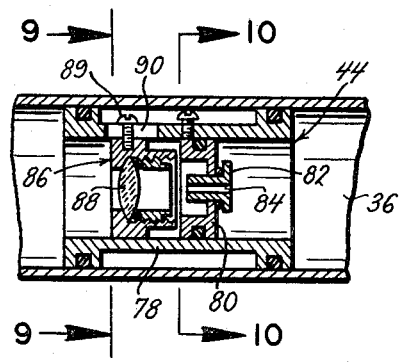
Figure 10:
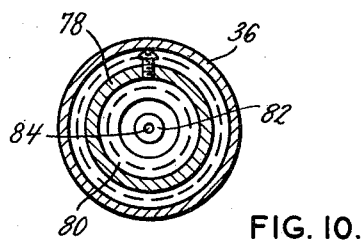
Figure 9:
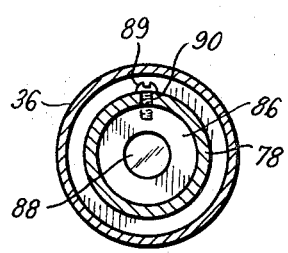

These and other objects and advantages of the present invention will become apparent after considering the following detailed specification which covers a preferred embodiment of the subject device in conjunction with the accompanying drawings wherein:

FIG. 1 is a top plan view of a device constructed according to the present invention;
FIG. 2 is a side view of the same device;
FIGS. 3–5 are enlarged fragmentary cross-sectional views taken respectively on lines 3—3, 4—4 and 5—5 of FIG. 1;
FIGS. 6–8 are enlarged fragmentary cross-sectional views taken respectively on lines 6—6, 7—7 and 8—8 of FIG. 2;
FIGS. 9 and 10 are enlarged fragmentary cross-sectional views taken respectively on lines 9—9 and 10—10 of FIG. 5;
FIG. 11 is a schematic diagram showing the subject device being used to observe a jet stream plasma; and
FIG. 12 is a block diagram of a circuit for use with the present invention.

Referring to the drawings more particularly by reference numbers, number 20 in FIGS. 1 and 2 refers generally to a device constructed according to the present invention for use in gathering data from which to determine the velocity of a luminescent gas stream such as arc jet exhausts and the like. The device includes a platform 22 having two upwardly extending portions 24 and 26, and a frame 28 supported on the platform 22 by means of threaded members 30 and 32 which cooperate with threaded bores in the respective portions 24 and 26. The threaded members 30 and 32 have associated sprocket portions 30a and 32a which are connected by a continuous sprocket chain 34 which can be moved to raise or lower the frame 28 relative to the platform 22.

The frame 28 includes means for supporting two spaced light collimating tubular members such as metal tubes 36 and 38 which are preferably formed of stainless steel or similar material. Each tube has an optical system which includes three similar spaced assemblies 40, 42 and 44 positioned therein. The construction of the assembles 40, 42 and 44 are shown respectvely in FIGS. 3, 4 and 5. The assembly 40 in each tube determines the size of a plasma sample to be view, the assembly 42 is provided in each tube to reduce stray light radiation which passes throught he respective assemblies 40, and the assembly 44 in each tube has aperture and lens means which distribute the incomng collimated light over the area of an associated light sensitive member or photomultiplier tube which will be described later.

The tubes 36 and 38 are positioned and oriented as shown in FIGS. 1 and 11 so that their optical axes observe spaced locations in a stream plasma. Usually the observed stream locations are axially spaced although in some cases such as when observing points away from the axis of the stream the two observed points may actually be at different radial distances from the axis. The subject device photometrically senses inherent light fluctuations at the two axially spaced locations and at different selected frequencies or frequency bands, and from informaton thus obtained the velocity is determined taking into account the distance between the spaced locations and the time of transit therebetween of similar signal components as determined by signal correlation means. A typical plasma may be an arc jet exhaust such as a hydrogen arc jet exhaust. Such an exhaust is shown in FIG. 11 being emitted from a structure which includes nozzle 46. The nozzle 46 in this structure acts as an anode and operates in conjunction with a cathode 48 positioned in housing 50 to produce the luminescent arc jet exhaust which is emitted. The subject device is designed and constructed to respond to the light given off by the exhaust and to produce data therefrom from which the exhaust velocity can be determined. This the present device is able to accomplish passively without in any way distrubing the stream plasma.

The outlet end of the nozzle 46 extends into a chamber formed by a housing structure 54, and the housing structure 54 includes one or more transparent windows 56 and 58 through which the plasma can be observed. A vacuum pump (not shown) is also connected to the chamber 52 to establish the necessary low pressure environment for the plasma stream, which stream is defined by the envelop 60 in FIG. 11. The collimating tubes 36 and 38 are directed toward the plasma so that extensions of their optical axes intersect the plasma at longitudinally spaced locations therealong. It has been found under test conditions for certain plasmas including a hydrogen arc jet exhaust that a spacing of the observation points of approximately 1.7 inches provides very satisfactory results. This will vary, however, depending on the plasma, the diameter of the plasma stream, the stream velocity and other conditions.

Referring to FIGS. 1 and 11 it can be seen that the plasma at the selected spaced locations to be observed must produce sufficient light so that the light passing through the apertures in the assemblies 40, 42 and 44 impinges on associated light sensitive surfaces of photomultiplier tubes 62 and 64 to produce signals. The intensity of the light reaching the photomultiplier tubes will determine the strength characteristics of the signals produced and the signals will also vary in intensity at some frequency. The intensity and frequency variations of the signals are used by circuits including signal correlation circuits to produce information data from which the velocity of the gas stream can be determined.

FIG. 3 is a cross-sectional view showing the details of one of the assemblies 40. The assembly 40 includes an annular member 66 which is sealably mounted in the associated tube 36 or 38 by means of O-ring 68. The member 66 has a central opening in which a plug 70 is positioned, and the plug 70 has an orifice 72 which is carefully sized to control the amount of the plasma that is viewed thereby.

FIG. 4 shows the details of one of the assemblies 42. Each assembly 42 includes an annular member 74 sealably mounted in the associated tube 36 or 38 and the member 74 has an opening or aperature 76 in alignment with the smaller aperture 72 in the assembly 40. The assemblies 42 prevent stray light from entering the tubes and adversely effecting the photomultipliers.

FIG. 5 shows the details of the assemblies 44, which are also positioned in the tubes 36 and 38. Each assembly 44 includes a tubular member 78 sealably mounted in the associated tube 36 or 38. An annular member 80 is mounted in the tubular member 78 as shown and has a plug 82 with an accurately sized aperture 84 therethrough. A lens assembly 86 is also mounted in the tubular member 78 and includes a lens 88 which is provided to distribute the incoming light from the plasma over the sensitive area of the associated photomultiplier tube 62 or 64. The position of the lens assembly 86 in the tubular member 78 relative to the member 80 can be adjusted by means of screw 89 which cooperates with elongated slot 90 in the tubular member 78. It can now be seen that each of the tubes 36 and 38 includes an optical system made up of assemblies 40, 42 and 44, and the incoming plasma light observed by each tube passes through the associated apertures 72, 76 and 84 and lens 88 wherein it is collimated and then directed against the photomultiplier tubes 62 and 64. The intensity and other characteristics of the light impinging on the photomultipliers produce signals which are then used to determine the velocity of the plasma stream.

FIGS. 9 and 10 are sectional views of the lens assembly 44 of FIG. 5 and are included to show more clearly the relationship of the members.

FIG. 7 shows a harness assembly which is mounted on the tubes 36 and 38 to hold them in a fixed relationship. The harness includes spaced plates 91 and 92 which are threadedly connected adjacent their ends by cooperating threaded members 94 and 96.

FIG. 8 is a sectional view showing the means provided for supporting the tubes 36 and 38 on the frame 28. The means include spaced rollers 98 which are mounted on a support member 100 attached to the frame 28. Support for the tube 36 is provided through the harness assembly of FIG. 7. Other means for adjusting the tubes will be described later.

FIG. 6 is a left end view of the device as shown in FIG. 2 showing a housing 102 to which one end of each of the tubes 36 and 38 is attached. The photomultipliers 62 and 64 are positioned in the housing 102 together with other devices including signal amplifier or preamplifier means. The housing 102 is pivotally mounted on the frame 28 by pivot means 104 which are on an upwardly extending frame bracket 106. Other support for the housing is provided by the rollers 98 and the member 100 (FIG. 8). The housing 102 and the attached tubes 36 and 38 can be tilted as an assembly to any desired angle and supported on threaded member 108 which includes a knob portion 110. The member 108 is threadedly engaged in the frame 28 and the upper end of the member engages and supports the housing 102 in any desired angular position. This enables the tubes to be positioned to sight at difficult angles relative to the plasma which lends flexibility and has advantages for some purposes. In all angular positions, however, the tube 38 is supported by the rollers 98 as shown in FIG. 8. Preamplifier or signal gain control means 112 and 114, respectively, for the photomultiplier tubes 62 and 64 are positioned in the housing 102 and are connected thereto and also to associated circuit means by suitable electrical connections.

The housing 102 and the tubes 36 and 38 can be oriented vertically by means of the sprocket chain 34 and/or rotationally as just described to observe any desired two locations in the gas stream spaced apart as determined by the harness assembly of FIG. 7. The spacing of the observed stream locations can also be changed if desired by loosening the harness and repositioning the tubes relative to each other. It has been found, however, that a spacing of from about one to about three inches covers a reasonable operation range for most gas streams with a spacing of from about 1.5 to about 1.7 inches usually providing the most accurate and meaningful data. The vertical adjustment means provided by the sprocket chain 34 also enables data to be taken at different vertical locations in the plasma in order to derive a velocity profile of the plasma. It is usually desirable, though not essential, to also have the upstream tube located to observe the stream immediately adjacent to the outlet side of the nozzle 46 as shown in FIG. 11.

The outputs of the photomultiplier tubes 62 and 64 after being amplified by suitable amplifier means are fed as inputs respectively to first and second band pass filter circuits 120 and 122 (FIG. 12). The output of the band pass filter 120 from tube 36 is fed to closed loop amplifier circuit 124 and then as one of two inputs to signal correlator circuit 126. The output of the other band pass filter 122 employed in conjunction with the tube 38 is fed to a delay line circuit 128 and thereafter to another closed loop amplifier circuit 130 and as a second input to the correlator circuit 126. The correlator circuit will optionally receive inputs from one or from both tubes 36 and 38 depending on the operating mode the instrument is in. When both filter circuits 120 and 122 receive inputs from the respective tubes 36 and 38 the circuit is in the cross-correlation mode and when both filter circuits receive an input from the same tube (usually the upstream tube) the circuit is in the autocorrelation mode. The correlator circuit 126 operates on the inputs and produces outputs which control a recording device 132 of a suitable type. The recorder 132 can be an oscilloscope, a tape recorder, a meter, or some other device capable of producing indications representing the output of the correlator circuit 126.

In the cross-correlation mode the frequencies of the natural random fluctuations of the signals produced by variations and fluctuations in the observed plasma light are divided into selected frequency bands. Control of the bands to be selected is by the setting of a control associated with each of the band pass filters 120 and 122. In each band setting the output of the correlator circuit 126 is recorded. In the cross-correlation mode the RMS level of the filtered outputs of each of the photomultipliers 62 and 64 is applied as an input to the correlator circuit 126 and the delay line circuit 128 is also adjusted to obtain a maximum correlator circuit output. The maximum occurs in the selected frequency bands when the inserted delay produced by adjusting the delay line 128 causes the signal readings from both photomultiplier tubes to appear to be in phase. This is indicated by a maximum reading on the recorder means 132. Cross-correlation is repeated in each of the selected frequency bands into which the natural random fluctuations of the input signals are divided.

The second operating mode is the auto-correlation mode which is performed by feeding the output from only one of the photomultiplier tubes 62 and 64 to the correlator circuit 126. In the auto-correlation mode, outputs are noted and recorded in the same selected frequency bands used in the cross-correlation mode and are similarly indicated by the recorder means 132. Usually auto-correlation is performed using the signals generated in the upstream tube which is the tube positioned to observe the jet stream as it emerges from the nozzle 46. If desired, however, auto-correlation can also be performed using outputs from the downstream tube as well. In the auto-correlation mode the delay line is adjusted to zero delay since the same signals are fed to both circuit channels. Furthermore, if a delay were introduced into one channel when operating in the auto-correlation mode it would tend to decrease the magnitudes of the outputs.

The data obtained during the cross-correlation and auto-correlation modes are used for evaluating similarities between the tube inputs, and are an indication of the validity of the stream velocity as computed from the data.

There are several ways to display and make use of the data obtained at the output of the correlator circuit. For example, the data can be displayed on a dual beam oscilloscope or to drive meters or the like. Such devices, however, are apt to be limited because of the presence of random noise superimposed on the signal outputs. It is therefore usually more desirable to correlate the signals using selected frequency bands at which natural fluctuations are observed. The boundaries of the selected bands can be adjusted by adjusting the variable band pass filters 120 and 122. In the cross-correlate mode the R.M.S. level of each of the outputs of the photomuliepliers is adjusted so that the signals applied to the inputs of the correlator circuit from the two channels are approximately equal. The delay line circuit 128 is then adjusted to vary the phase of the leading input signal relative to the lagging input until the correlator output passes through a maximum. This procedure results in producing a cross-correlation curve which may be expressed by the equation:

$$R_{xy(\tau)} = \frac{1}{2T} \int_{-T}^{T} x(t) y(t+\tau) dt$$

where $R_{xy(\tau)}$ is the cross-correlation function,
$x(t)$ is the signal input A to the correlator circuit from one channel,
$y(t)$ is the signal input B from the other channel, and
$\tau$ is the magnitude of time delay produced by adjusting delay line circuit 128.

Auto-correlation is achieved in a manner similar to cross-correlation only using the upstream photomultiplier output as the input to both of the channels, and setting the delay line circuit to zero delay which should produce the maximum conditions. Auto-correlation as already stated is also preferably performed in the same frequency bands as cross-correlation. The auto-correlation function can be expressed by the equation:

$$R_{xx(\tau)} = \frac{1}{2T} \int_{-T}^{T} x(t) x(t+\tau) dt$$

where $R_{xx(\tau)}$ is the auto-correlation function, and
$x(t)$ is the signal input A applied to both of the correlation channels.

The data obtained during cross-correlation and auto-correlation can be plotted and used to determine the velocity of the gas stream plasma. The stream velocity can be determined in several ways. For example, the velocity can be expressed by the equation:

$$V = .15/\tau_0$$

where V is the velocity in feet per second, $\tau_0$ is the time delay determined when $R_{xy}$ is adjusted to maximum, and the constant is a factor which takes into account parameters such as the spacing between the stream observation points, the condition of the plasma, and so on.

The stream velocity can also be determined by providing a third mode of operation called the cosine $\theta$ mode. In this mode the phase relationship between the two inputs is determined and used to calculate velocity. The phase relationship can be indicated on a recording device such as a strip chart recorder. If a phase $\theta$ mode is provided, the stream velocity can be computed by the equation:

$$V = 51 f_0 / \theta$$

where $f_0$ is the band center frequency in cycles per second, and
$\theta$ is the phase angle between the two signals generated in the collimating tubes 36 and 38 expressed in degrees.

It can now be seen that the subject device is capable of sensing light fluctuation in a luminescent gas stream at two positions in the stream plasma without disturbing the flow in any way, and these sensed light fluctuations can then be used to determine the velocity of the stream. The light fluctuations are preferably sensed at two axially spaced locations in the stream, and the stream velocity is determined using the known distance between the observed stream locations and the time of transit of similar sensed light fluctuations in moving between the said spaced locations as determined by the signal correlation means. This can be done using two or three operating modes as described. In one mode, the outputs are cross-correlated using an adjustable delay, in a second mode the outputs of only one of the tubes are used, and in the third mode both tube outputs are used to determine a phase relationship.

While the subject device has been described in connection with a particular preferred embodiment and in conjunction with a luminescent gas stream, it is apparent that it can also be used to determine the velocity of other media as well including any fluid medium.

Thus there has been shown and described novel means for determining the velocity of gas streams such as luminescent gas streams or jets which fulfills all of the objects and advantages sought therefor. Many changes, modifications, variations, and other uses and applications of the subject device will, however, become apparent to those skilled in the art after considering this specification and the accompanying drawings. All such changes, modifications, alterations, and other uses and applications which do not depart from the spirit and scope of the invention are deemed to be covered by the invention which is limited only by the claims which follow.

What is claimed is:

1. Means for obtaining data from which to determine the velocity of a luminescent gas stream comprising a pair of spaced optical devices oriented to observe the stream at spaced locations, light sensitive means associated with each of said optical devices and positioned to have light impinge thereon from the stream, said light sensitive means including means for producing outputs which characterize the light impinging thereon, means connected to respond to the outputs of the light sensitive means for correlating said outputs, said correlating means including means for cross-correlating the outputs of said light sensitive means, and means for delaying the receipt of the output from one of the light sensitive means in order to maximize the output of the correlating means.

2. The means defined in claim 1 wherein means are provided to permit the output of only one of said light sensitive means to be fed to the correlation means.

3. The means defined in claim 1 wherein frequency responsive filter means are provided between the output of each of said light sensitive means and the correlation means, and means for adjusting the said filter means to select a desired band of frequencies to be passed from the associated light sensitive means to the correlation means.

4. The means defined in claim 1 wherein one of said light sensitive means is positioned to observe the stream at some point upstream from the other light sensitive means and wherein means are provided to determine the phase relationship between the outputs produced by the light sensitive means associated with said spaced optical devices, said last named means including frequency sensitive means associated with each of said light sensitive means and means for adjusting the frequency of at least one of said frequency sensitive means.

5. Means for determining the velocity of a luminescent stream comprising a pair of spaced light collimating tubes, means mounting said tubes in positions to observe spaced locations in the stream, light sensitive means associated with each of said tubes positioned to respond to the stream luminescence at the observed locations and to produce electrical responses proportional thereto, a first circuit channel having an input connected to the light sensitive means associated with one of said collimating tubes and an output, a second circuit channel having an input and an output, means optionally connecting the input of said second circuit channel to one of the said light sensitive means, and signal correlator means connected to the outputs of said first and second circuit channels, said correlator means including means producing an output correlation signal having characteristics which vary in response to the sum of the channel outputs.

6. The means defined in claim 5 wherein said optional connecting means include switch means having a first operating position for selectively connecting the light sensitive means associated with the respective collimating tubes to the inputs to the first and second circuit channels, and a second operating position connecting the light sensitive means associated with a selected one of the collimating tubes to the inputs of the first and second circuit channels.

7. The means defined in claim 5 wherein one of said channels is provided with means for delaying the electrical responses received thereby from the associated light sensitive means by an amount to make it appear that the outputs of the first and second circuit channels are in phase.

8. The means defined in claim 6 wherein said signal correlator means includes means for cross-correlating responses produced by said pair of collimating tubes when the switch means are in the first operating position, and means for auto-correlating responses fed to the first and second circuit channels when the switch means are in their second operating position.

9. The means defined in claim 6 wherein said signal correlator means include means for determining the phase relationship between the responses produced in said pair of collimating tubes.

10. Means for gathering data from which to determine the velocity and velocity profile of a luminescent gas stream comprising a pair of spaced light collimating tubes, means for mounting said tubes in positions to observe spaced upstream and downstream locations in the luminescent stream, said last named means including means for selectively adjusting the observed stream locations while maintaining a relationship between the observed locations such that corresponding stream conditions move past both observed locations, each of said collimating tubes including electro-optical means including means defining the observed stream areas and means sensitive to the luminescence of the stream and to variations therein at the observed locations, said luminescent sensitive means including means producing electric signals which vary in frequency and intensity in proportion to the conditions of the stream luminescence at the observed locations, and circuit means connected to said luminescent sensitive means including means for cross-correlating electric signals produced by the two collimating tubes and means for auto-correlating signals produced by a selected one of said light sensitive means.

11. The means defined in claim 10 including means for frequency selecting the electric signals to be cross-correlated and auto-correlated.

12. The means defined in claim 10 including means for delaying the signals from one of said luminescent sensitive means during cross-correlation to make it appear that the signals of both luminescent sensitive means are in phase.

References Cited

UNITED STATES PATENTS

| | | |
|---|---|---|
| 2,219,775 | 10/1940 | Harrison. |
| 2,306,073 | 12/1942 | Metcalf. |
| 3,175,459 | 3/1965 | Smith et al. _____ 73—194 X |

RICHARD C. QUEISSER, *Primary Examiner.*

EDWARD D. GILHOOLY, *Assistant Examiner.*